April 27, 1948. R. E. VINYARD 2,440,454
RECOVERY OF HYDROGEN FLUORIDE IN AN ALKYLATION PROCESS
Filed July 18, 1944
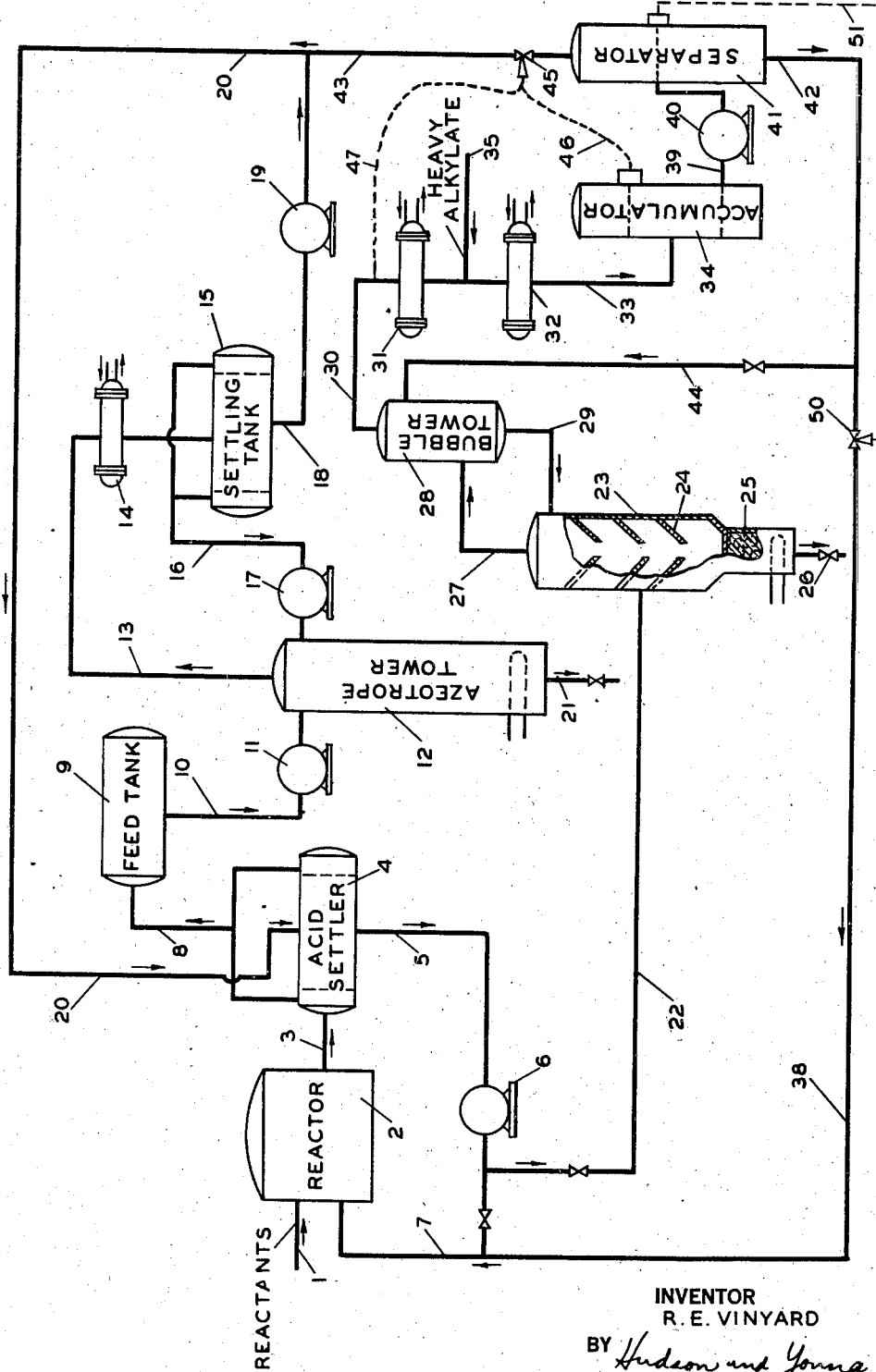
INVENTOR
R. E. VINYARD
BY Hudson and Young
ATTORNEYS Patented Apr. 27, 1948

2,440,454

UNITED STATES PATENT OFFICE 2,440,454

RECOVERY OF HYDROGEN FLUORIDE IN AN ALKYLATION PROCESS

Roy E. Vinyard, Borger, Tex., assignor to Phillips Petroleum Company, a corporation of Delaware Application July 18, 1944, Serial No. 545,415

2 Claims. (Cl. 260—683.4)

The present invention relates to a process for the alkylation of hydrocarbons by the use of hydrogen fluoride or hydrofluoric acid and similar reagents as alkylation catalysts and relates particularly to a process for the recovery of hydrogen fluoride and removal therefrom of acid-soluble hydrocarbon oils which are formed in such alkylation reactions.

Processes for the alkylation of hydrocarbons, for example, alkylation of isobutane with ethylene to produce diisopropyl and alkylation of isobutane with butylene to produce isooctanes, by means of catalysts such as hydrofluoric acid are well known to the art. Such processes are described, for example, in Frey Patents No. 2,322,800 and 2,317,901 and also in the articles by Frey in Chemical and Metallurgical Engineering, 1943, vol. 50, pages 126 to 128 (November, 1943), and Philnews, December, 1943, pages 7 to 10. In such processes, a mixture of an alkylatable substance, such as isobutane, and an alkylating reactant, such as 1-butene or 2-butene or a butane-butene fraction, are agitated together with liquid concentrated hydrofluoric acid or liquid anhydrous hydrogen fluoride at a temperature within the range of approximately 35° to approximately 100° F. The mixture is then allowed to settle and the hydrocarbon layer is separated from the acid layer. The acid layer is recycled to the reactor or contactor to catalyze the alkylation of further amounts of alkylatable substance.

The hydrocarbon layer, which still contains some hydrogen fluoride or concentrated hydrofluoric acid, is then subjected to distillation, whereby an azeotrope is formed between the lower-boiling or unalkylated hydrocarbons and the hydrofluoric acid, which are recycled to the contactor, generally after allowing the condensed distillate to stratify and separating the two layers. After the hydrofluoric acid has been expelled from the hydrocarbon layer in this manner, the hydrocarbon layer is then treated to effect the removal of any small proportions of alkyl fluorides or other organic fluorine compounds which may have been formed in the reaction and the alkylated products are recovered in more or less conventional manner.

As the hydrofluoric acid continues to be reused in the process, acid-soluble oils begin to accumulate therein. These acid-soluble oils, which are referred to in the copending application of Frederick E. Frey, Serial No. 429,961, filed February 7, 1942, and which are a by-product of the alkylation reaction, vary greatly in composition and characteristics but are in general normally liquid materials that are soluble in hydrogen fluoride, partly soluble in water and partially soluble in hydrocarbons. They appear to have a tendency to reduce the catalytic activity of hydrofluoric acid and to vary the course of the alkylation reaction. For these reasons, their removal from the hydrofluoric acid before it is recycled for reuse in alkylation processes is generally necessary. The amount of these acid-soluble oils which is formed may amount to from 1 to 2 per cent or more of the alkylated product. A typical acid-soluble oil has the following characteristics:

| | |
|---|---|
| Specific gravity at 25° C | 0.8881 |
| Refractive index at 20° C | 1.5013 |
| Unsaturation (cc. 1% bromine soln. per cc.) | 34.9 |
| Sulfur, per cent by wt | 2.17 |
| Fluorine, per cent by wt | 0.0013 |
| Color | Dark red to brown in transmitted light |
| Solubility in 98% $H_2SO_4$ | 80% |
| Aniline point | 35° C. |

The sulfur in this acid-soluble oil probably originates for the most part from impurities present in the hydrocarbons treated and in smaller part from the hydrofluoric acid used in the particular alkylation. A method for recovery of hydrogen fluoride from this oil is described in said copending application of Frederick E. Frey.

The present invention is more particularly directed to the process of recovering spent hydrofluoric acid and removing acid-soluble oils therefrom.

It is an object of the present invention to provide in a continuous alkylation process a process for the recovery of hydrogen fluoride or hydrofluoric acid from alkylation reaction mixtures and effect the removal of acid-soluble oils therefrom.

It is a further object of the present invention to provide such a process in which the removal of acid-soluble oils from the hydrofluoric acid is effected without the introduction of other undesirable materials into the reaction mixture.

Other objects and advantages of the invention, some of which are referred to specifically hereinafter, will be apparent to those skilled in the art.

In accordance with the process of the invention, acid-soluble oils are removed from the hydrogen fluoride or hydrofluoric acid layer containing light hydrocarbons that are separated from a hydrocarbon alkylation reaction mixture by a distillation procedure in which a heavy hydrocarbon alkylate obtained as a by-product in the process is used to absorb the light hydrocarbons and thereby reduce the pressure prevailing during the distillation. The distillation and the subsequent separation of hydrofluoric acid and light hydrocarbons are thereby facilitated. The invention also contemplates a further improved procedure whereby the light hydrocarbons are freed from the heavy hydrocarbon alkylate absorption oil introduced in this manner so that they may be returned to the alkylation reaction mixture without the heavy hydrocarbon alkylate.

A preferred embodiment of the process of my invention is represented on the accompanying drawing, which is a flow diagram thereof. In accordance with this preferred embodiment, hydrocarbons to be subjected to alkylation and hydrofluoric acid are charged through conduit 1 to reactor 2. In this reactor the hydrocarbons, which may be a mixture of isobutane and ethylene, are mixed intimately with the hydrofluoric acid by means of stirrers for a suitable period of time. The mixture then flows through conduit 3 to acid-settling tank 4.

In the acid-settling tank 4, the two layers are separated, the lower or acid layer being returned to the reactor through conduit 5 by means of pump 6 and conduit 7, and the upper or hydrocarbon layer being passed through conduit 8 to feed tank 9. From the feed tank 9, the hydrocarbon layer, which contains entrained and dissolved hydrofluoric acid, is charged through conduit 10 by means of pump 11 to azeotrope tower 12.

In the azeotrope tower 12, which is a fractional-distillation apparatus, the entrained and dissolved hydrofluoric acid is separated from the major portion of the accompanying hydrocarbon by means of distillation, the hydrofluoric acid forming an azeotropic mixture with isobutane, which is generally used in excess when isobutane is alkylated with ethylene, or an azeotrope with another low-boiling hydrocarbon. This azeotrope is the overhead of the distillation and passes through conduit 13 and condenser 14 into settling tank 15. A separation of acid and hydrocarbon from the azeotropic mixture in settling tank 15 takes place and the hydrocarbon is returned to azeotrope tower 12 through conduit 16 by means of pump 17. The acid which separates out in settling tank 15 is returned through conduit 18 by means of pump 19 through conduit 20 into acid-settling tank 4, where it is commingled with the effluent from reactor 2. Instead of being returned to acid settling tank 4 it may be passed directly to reactor 2, if desired. This alternative is not represented on the drawing. Part of the light hydrocarbons from settling tank 15, instead of being returned as reflux to azeotrope tower 12, may be charged to reactor 2. The bottoms in the azeotrope tower 12 consist of hydrocarbons which are referred to hereinafter as total hydrocarbon effluent. This total hydrocarbon effluent is removed through outlet 21 and is subjected to a recovery treatment. The unreacted lower-boiling hydrocarbons are separated from the alkylate by fractional distillation, preferably after subjecting the total hydrocarbon effluent to defluorination by treatment with selective solvents or by passing the effluent over bauxite or other contact material, as described, for example, in the application of Frederick E. Frey, Serial No. 398,361, filed June 16, 1941 (Patent No. 2,347,945). The desired alkylated hydrocarbon fraction is then separated from heavy alkylate by distillation of the total hydrocarbon effluent and recovered. The heavy alkylate is used as hereinafter described; some of it may be removed from the process.

Instead of making a separation of acid and hydrocarbon in acid settling tank 15, the unseparated acid and hydrocarbon material from azeotrope tower 12 may be returned directly to acid settler 4 or to reactor 2. This alternative is not represented on the drawing. Normally the azeotrope tower 12 is maintained at a higher prevailing operating pressure than acid settler 4 or reactor 2. Advantage may be taken of these differences in pressure to dispense with the pumps 17 and 19 and eliminate acid settling tank 15 by returning the unseparated acid and hydrocarbon material from azeotrope tower 12 directly to acid settler 4 or reactor 2, in accordance with this alternative.

The acid in acid settler 4 will contain absorbed and dissolved acid-soluble oils. These acid-soluble oils, whose characteristics were referred to hereinbefore, generally have a higher boiling point than the heavy alkylate fraction, a lower API gravity, and are much more highly unsaturated than the alkylate fraction. If not removed, these acid-soluble oils accumulate in the recycled acid and have a deleterious effect on the alkylation reaction. These acid-soluble oils appear to lower the yield of alkylated product in the reaction, have an effect on the course of the alkylation reaction, since the resulting products generally have a lower octane number than is obtained by alkylation in the absence of acid-soluble oils, and they appear to favor the formation of organic fluorine compounds in the alkylate and further amounts of acid-soluble oils. The removal of these acid-soluble oils from the acid is effected, in accordance with the preferred embodiment of my invention, as follows:

All or a portion of the acid layer from acid settler 4, which may be heated to vaporization temperature or lower, is passed through conduit 5 by means of pump 6 through conduit 22 into flash tower 23. This flash tower is a simple fractionating column in which baffles or mist entrainers 24 are provided. The bottom portion of the tower is packed with lump coal 25 or other granular material that is inert to hydrofluoric acid. The acid-soluble oils collect in the packing 25 and are withdrawn periodically through outlet 26. The overhead distillate consists of hydrofluoric acid together with hydrocarbons such as isobutane having lower boiling points than the acid-soluble oils. The overhead leaving the flash tower 23 through conduit 27 passes into a bubble tower 28, which is a conventional fractionating tower having two or more plates or trays provided with bubble caps, that is also in communication with the tower 23 by return-flow conduit 29, and then passes through conduit 30 and condenser 31, condenser 32, conduit 33 and into accumulator 34.

To reduce the vapor pressure in the system from the flash tower 23 to accumulator 34, heavy alkylate (which may be obtained by distillation from the total hydrocarbon effluent removed at outlet 21 from azeotrope tower 12) is added through conduit 35. The heavy alkylate dissolves and absorbs the lower-boiling hydrocarbons and, besides effecting a reduction in the vapor pressure, facilitates the separation of acid and hydrocarbons into two layers in accumulator 34.

I am aware that heavy liquid hydrocarbons such as heavy alkylate has been used to extract low-boiling hydrocarbons that are associated with hydrofluoric acid. Such a process is described in the copending application of Karl H. Hachmuth, Serial No. 453,885, filed August 6, 1942, patented May 15, 1945, Patent No. 2,376,051. The purpose and use of the heavy alkylate in the process as described in said application are entirely different from those of the present invention. In the process of the present invention, the heavy alkylate or other hydrocarbon absorption oil is not contacted with acid-soluble oils or with materials containing substantial proportions of acid-soluble oils.

In operating with accumulator 34 and separator 41, which is the preferred method of practicing the process of the invention, the lower acid layer in accumulator 34 is maintained at a more or less constant level therein by drawing off the mixed hydrocarbon (heavy alkylate) and acid layer through conduit 39 by means of pump 40 into separator 41. The pressure in accumulator 34 and in the connecting conduit 30 is controlled by means of the addition or injection of heavy alkylate through conduit 35 and by control of the liquid level in accumulator 34. This liquid level may be automatically regulated by a valve 45 on separator 41 controlled by a liquid-level control 46. Alternatively the pressure in conduit 30 may be controlled and the process operated in such manner that no substantial vapor phase is present in accumulator 34 and the liquid level (mixed hydrocarbon and acid phase) or gas-vapor interface is permitted to be at some point in condensers 31 or 32. The valve 45 may be, in such event, controlled automatically by an alternative pressure control 47 in conventional manner. The pressure which it will generally be desirable to maintain in conduit 30 by either of these two or other alternative methods is between approximately 20 and approximately 50 pounds per square inch gage.

In the separator 41, the upper mixed hydrocarbon and acid layer is drawn off, preferably automatically through valve 45 as described and conduit 43 into conduit 20, through which it is charged into acid settler 4. The lower acid phase or layer in separator 41 is returned to the reactor 2 through conduits 42 and 38, or may be returned to bubble tower 28, as hereinafter disclosed.

The function of separator 41 is to separate acid from heavy alkylate. All of the heavy alkylate in separator 41 together with all or a portion of the acid is returned through conduits 43 and 20 to acid settler 4. Acid free from heavy alkylate, which is to be used as reflux in bubble tower 28, is discharged at the bottom of separator 41 and is passed through conduits 42 and 44. Some of the acid removed from the bottom of separator 41 may be returned to reactor 2 through conduits 42, 38 and 7. The amount of acid charged back to reactor 2 in this manner may be controlled by a valve 50 which is actuated automatically by a liquid-level control 51.

The various pumps are constructed of suitable acid-resisting materials and with packing glands that may be flushed with hydrocarbon or other material to reduce the possibility of leakage and corrosion. Pump 6 is flushed with isobutane which is charged from an external source through the gland packing. The gland packings of pumps 11 and 17 may be flushed with petroleum lubricating oil in a similar manner. However, the gland packing of pump 40 is preferably and most advantageously flushed with heavy alkylate itself. In a typical operation this heavy alkylate is charged to the pump at the rate of 5 barrels per hour or more and is commingled with the acid and heavy alkylate passing through the pump and is removed in separator 41 together with the heavy alkylate in the other materials therein.

In this manner the amount of acid-soluble oils which are recycled to the reactor may be controlled. There is no deleterious effect produced on recycling small proportions of the heavy alkylate fraction back into the reactor, should any be retained in the acid circulating through conduits 42, 38 and 7; that which is returned to the acid settler 4 is separated therein and is passed forward with the total hydrocarbon effluent and may be again recovered at the outlet 21 of azeotrope tower 12. The heavy alkylate, in which are dissolved the light hydrocarbons associated with the hydrofluoric acid, facilitates the separation of the acid from light hydrocarbons in accumulator 34 and separator 41. The light hydrocarbons remain dissolved in the heavy alkylate.

In a typical example of a method of practicing the invention, isobutane and ethylene together with hydrofluoric acid are charged continuously to reactor 2. The resulting alkylation reaction mixture is charged to acid settler 4 operating at a temperature of approximately 80° F. and the hydrocarbon layer is passed to feed tank 9 and distilled in azeotrope tower 12. The charge to the azeotrope tower 12 is at a rate of approximately 1000 barrels per hour; of this approximately 100 barrels per hour pass over as overhead and approximately 900 barrels per hour are discharged through conduit 21. The acid from acid settler 4 which is circulating back to reactor 2 is removed continuously from the recycle stream at the rate of about 38 barrels per hour and is subjected to distillation in flash tower 23, which is operating at a temperature of approximately 260° F. From the bottom of the flash tower 23, acid-soluble oils and water are removed at a rate of approximately 2 barrels per hour. The bubble tower 28 connected to the flash tower 23 is operated at a temperature of approximately 175° F. and a pressure of approximately 40 pounds per square inch, which is maintained by introduction of heavy alkylate into conduit 35 at the rate of approximately 12 barrels per hour and by control of the liquid level in accumulator 34. About 5 barrels per hour of heavy alkylate is charged to pump 40 to flush the gland seals thereof. The temperature of accumulator 34 is approximately 80° F. The acid phase from separator 41 is returned to the bubble tower 28 at the rate of approximately 14 barrels per hour. The mixed acid and heavy alkylate phase from separator 41 is charged back to the acid separator 4 at the rate of approximately 53 barrels per hour (17 barrels per hour of heavy alkylate introduced through conduit 35 and gland seals of pump 40 and 36 barrels per hour of hydrofluoric acid and absorbed butanes).

In other operations it is to be understood that these flow rates and temperatures may be varied over a wide range, dependent upon the type of hydrocarbon material being treated and the character of heavy alkylate and similar factors. The amount of acid which is removed from circulation between the acid settler and the reactor will also be variable and dependent upon the reaction conditions prevailing and the rate of formation of acid-soluble oils which acumulate in the recycle stream. In general it may be stated that the amount of heavy alkylate or other hydrocarbon absorption oil which is added is such as to maintain a pressure of approximately 20 to approximately 50 pounds per square inch gage in the bubble tower 28 or conduit 30 of the system and thereby facilitate the distillation and subsequent separation of the acid and hydrocarbons in the acid stream.

Instead of using heavy alkylate for the absorption of liquid hydrocarbons and to maintain the desired pressure, other hydrocarbon materials which have a low vapor pressure and are substantially inert with respect to the light hydrocarbons in the presence of hydrofluoric acid and which are capable of dissolving the light hydrocarbons may be used. Thus heavy normally liquid normal paraffin hydrocarbons may be used. Heavy alkylate is a preferred material since it is readily available as a byproduct in such alkylation processes and is substantially inert and not substantially susceptible to further reaction under the prevailing conditions.

It is to be understood that the foregoing description is merely illustrative, that the drawing is merely a diagrammatic representation of the flow of materials in the process, and that the actual apparatus which will be required may include heaters, pumps, valves (some of which are represented), pressure gauges, flow meters, heat exchangers, reflux accumulators, surge tanks and other conventional equipment which will be understood by those skilled in the art to which the invention pertains.

It is further contemplated that the apparatus will be constructed of metals and other materials which are inert or resistant to hydrofluoric acid and/or other substances which are used in contact with the apparatus. Such materials of construction are described in the article by Charles M. Fehr, "Materials of construction for anhydrous hydrofluoric acid," in Chem. Met. Eng., 1943, vol. 50, page 129 (November, 1943), and in the articles of Frey referred to hereinbefore.

Inasmuch as the foregoing description comprises preferred embodiments of the invention, it is to be understood that the invention is not limited thereto and that alterations and modifications may be made therein without departing from the scope of the invention or the scope of the appended claims.

I claim:

1. An improved continuous process for the alkylation of an alkylatable hydrocarbon with an olefin in the presence of concentrated hydrofluoric acid as an alkylation catalyst and for an improved recovery of said concentrated acid catalyst, which comprises continuously passing an alkylatable hydrocarbon and an olefin hydrocarbon together with said hydrofluoric acid to a reaction zone under alkylation conditions and subjecting them to reaction therein, passing the reaction mixture to an acid-settling zone and therein separating a liquid hydrocarbon phase from a liquid hydrofluoric acid phase which contains light hydrocarbons and acid-soluble oils dissolved therein, separately fractionating said hydrocarbon phase to recover light alkylate and heavy alkylate and recirculating a portion of said acid phase together with fresh hydrocarbon reactants to said reaction zone, passing another portion of said acid phase to a first distillation zone, flash distilling from said first distillation zone at about 260° F. a vaporous overhead product comprising hydrofluoric acid and light hydrocarbons and a liquid bottom product comprising acid-soluble oils, passing said overhead product to a second distillation zone operating at about 175° F., removing from said second distillation zone a liquid bottom product and passing same back to said first distilaltion zone as a reflux therefor, removing also from said second distillation zone a vaporous overhead product comprising hydrofluoric acid and light hydrocarbons, separately contacting said latter vaporous overhead product from said second distillation zone with a heavy alkylate obtained from the alkylation reaction to substantially absorb said light hydrocarbons, said heavy alkylate being introduced into said latter vaporous overhead product in an amount such that the pressure of said overhead product is about 40 pounds per square inch gage, thereafter cooling said latter vaporous overhead product and added heavy alkylate to condense remaining unabsorbed vapors and separating a resulting liquid acid phase comprising purified hydrofluoric acid from a resulting liquid alkylate phase comprising said heavy alkylate and absorbed light hydrocarbons, passing a portion of said purified hydrofluoric acid to said second distillation zone as a reflux therefor and passing another portion of said purified hydrofluoric acid to said reaction zone, controlling the flow of said purified acid to said reaction zone responsive to the liquid level of said acid phase, passing said liquid alkylate phase to said acid-settling zone for subsequent recovery of said heavy alkylate in the fractionation of the hydrocarbon phase therefrom, and controlling the flow of said alkylate phase to the settling zone responsive to the pressure of said overhead product.

2. An improved continuous process for the alkylation of an alkylatable hydrocarbon with an olefin in the presence of concentrated hydrofluoric acid as an alkylation catalyst and for an improved recovery of said concentrated acid catalyst, which comprises continuously passing an alkylatable hydrocarbon and an olefin hydrocarbon together with said hydrofluoric acid to a reaction zone under alkylation conditions and subjecting them to reaction therein, passing the reaction mixture to an acid-settling zone and therein separating a liquid hydrocarbon phase from a liquid hydrofluoric acid phase which contains light hydrocarbons and acid-soluble oils dissolved therein, separately fractionating said hydrocarbon phase to recover light alkylate and heavy alkylate and recirculating a portion of said acid phase together with fresh hydrocarbon reactants to said reaction zone, passing another portion of said acid phase to a distillation zone, flash distilling from said distillation zone at an elevated temperature a vaporous overhead product comprising hydrofluoric acid and light hydrocarbons and a liquid bottom product comprising acid-soluble oils, separately contacting said vaporous overhead product from said distillation zone with a heavy alkylate obtained from the alkylation reaction to substantially absorb said light hydrocarbons, said heavy alkylate being introduced into said vaporous overhead product in an amount such that the pressure of said overhead product is between about 20 and about 50 pounds per square inch gage, thereafter cooling said vaporous overhead product and added heavy alkylate to condense remaining unabsorbed vapors and separating a resulting liquid acid phase comprising purified hydrofluoric acid from a resulting liquid alkylate phase comprising said heavy alkylate and absorbed light hydrocarbons, passing a portion of said purified hydrofluoric acid to said distillation zone as a reflux therefor and passing another portion of said purified hydrofluoric acid to said reaction zone, controlling the flow of said purified acid to said reaction zone responsive to the liquid level of said acid phase, passing said liquid alkylate phase to said acid-settling zone for subsequent recovery of said heavy alkylate in the fractionation of the hydrocarbon phase therefrom, and controlling the flow of said alkylate phase to the settling zone responsive to the pressure of said overhead product.

ROY E. VINYARD.

REFERENCES CITED

The following references are of record in the file of this patent:

UNITED STATES PATENTS

| Number | Name | Date |
|---|---|---|
| 2,002,731 | Coubrough | May 28, 1935 |
| 2,152,155 | Rude | Mar. 28, 1939 |
| 2,342,364 | Parker | Feb. 22, 1944 |
| 2,376,051 | Hachmuth | May 15, 1945 |
| 2,388,918 | Iverson | Nov. 13, 1945 |
| 2,388,919 | Iverson | Nov. 13, 1945 |

FOREIGN PATENTS

| Number | Country | Date |
|---|---|---|
| 117,359 | Australia | Aug. 5, 1943 |

OTHER REFERENCES

National Pet. News. Tech. Sec., Mar. 1, 1944, pages R–146, R–148, R–150, R–151, R–154, R–155, Pat. Off. Lib. (Presented at Am. Inst. Chem. Eng's. Pittsburgh, Nov. 14–16, 1943, and published in Dec. 25, 1943, Trans. of the Inst., vol. 39, No. 6.)